US007711806B1

(12) United States Patent
Roka et al.

(10) Patent No.: US 7,711,806 B1
(45) Date of Patent: May 4, 2010

(54) METHOD FOR DYNAMICALLY ADJUSTING FREQUENCY OF CONTENT TRANSMISSIONS TO A COMMUNICATION DEVICE

(75) Inventors: Pujan K. Roka, Olathe, KS (US); Kevin E. Hunter, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1022 days.

(21) Appl. No.: 11/432,930

(22) Filed: May 12, 2006

Related U.S. Application Data

(63) Continuation-in-part of application No. 11/280,031, filed on Nov. 16, 2005.

(51) Int. Cl.
G06F 15/173 (2006.01)
(52) U.S. Cl. .................. 709/223; 709/224; 709/217
(58) Field of Classification Search ......... 709/223–224, 709/227–228, 217, 203
See application file for complete search history.

(56) References Cited

U.S. PATENT DOCUMENTS

| 5,918,014 | A | 6/1999 | Robinson |
| 6,629,284 | B1* | 9/2003 | Leermakers ............... 714/748 |
| 6,763,354 | B2 | 7/2004 | Hosken |
| 6,996,609 | B2 | 2/2006 | Hickman et al. |
| 7,107,406 | B2 | 9/2006 | Kurasugi |
| 7,200,390 | B1 | 4/2007 | Henager et al. |
| 2003/0018751 | A1 | 1/2003 | Lee et al. |
| 2005/0132295 | A1 | 6/2005 | Noll et al. |
| 2005/0154608 | A1* | 7/2005 | Paulson et al. ................. 705/1 |
| 2006/0094404 | A1* | 5/2006 | Burgess ...................... 455/415 |
| 2007/0198468 | A1* | 8/2007 | Berger .......................... 707/2 |

OTHER PUBLICATIONS

Steve Corman, "The George Concept," http://george.asu.edu/concept.htm, printed from the World Wide Web on Mar. 31, 2005.
"Push: The next wave of Net news?," http://www.jdlasica.com/articles/push.html, printed from the World Wide Web on Mar. 31, 2005.
"XML.com: What is RSS?," http://www.xml.com/pub/a/2002/12/18/dive-into-xml.html, printed from the World Wide Web on Apr. 4, 2005.
U.S. Appl. No. 11/280,031, filed Nov. 16, 2005.

* cited by examiner

*Primary Examiner*—Philip B Tran

(57) ABSTRACT

A method for dynamically adjusting the frequency of content-transmissions to a communication device is disclosed. The device logs and reports to a network entity, such as a content server, how often content-related user-interaction has occurred on the device, such as simply when the last such interaction occurred. The network entity then determines a frequency at which to transmit content to the device, based on how often the content-related user-interaction has occurred on the device. And the network entity then transmits content to the device at the determined frequency. The invention can be usefully employed to adjust the frequency at which content-channel updates or content-catalog updates are transmitted to communication devices such as cellular wireless devices for instance.

14 Claims, 4 Drawing Sheets

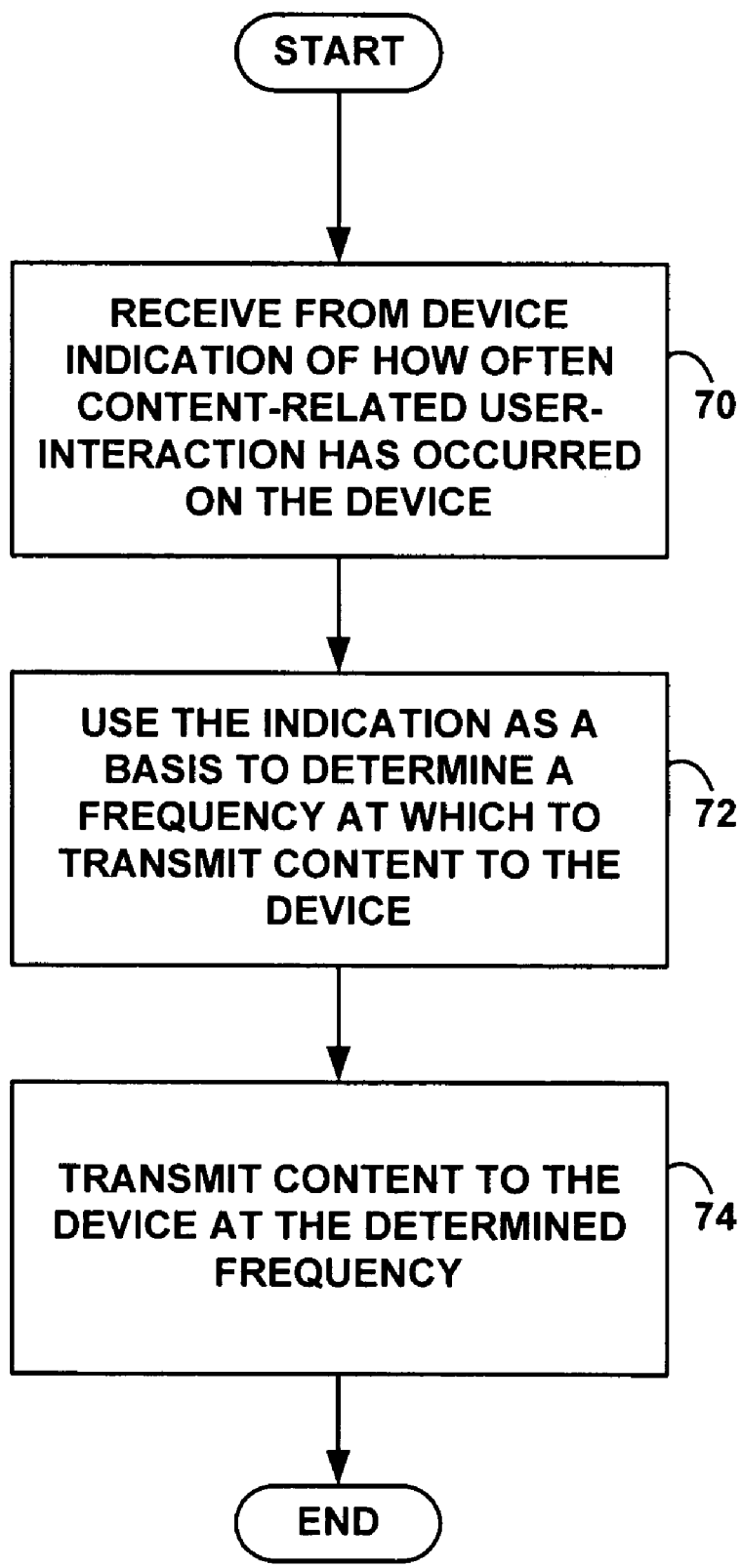

METHOD FOR DYNAMICALLY ADJUSTING FREQUENCY OF CONTENT TRANSMISSIONS TO A COMMUNICATION DEVICE

REFERENCE TO RELATED APPLICATION

This application is a continuation-in-part of U.S. patent application Ser. No. 11/280,031, filed Nov. 16, 2005, the entirety of which is hereby incorporated by reference.

FIELD OF THE INVENTION

The present invention relates to network communications and, more particularly, to managing content transmissions to client devices. The invention is particularly useful in the context of wireless communications, although the invention can be applied in other network arrangements (e.g., landline networks) as well.

BACKGROUND

With the widespread growth of the Internet and advances in communication technology, users of communication devices can conveniently gain access to a virtually unlimited quantity of information and services. This is especially true with wireless communication devices, such as cell phones and wirelessly-equipped personal digital assistants for instance, which provide users with access to such information from virtually any location where wireless coverage exists.

One way for users to most conveniently access content is to subscribe to a service where content is automatically transmitted to their devices. In an increasingly common arrangement, for instance, a server may be set to periodically transmit the latest version of particular content to subscriber devices. That way, when a user seeks to access content, the user can conveniently access the latest received version of the content from local data storage, without the need to wait for the content to download the content at the time. Further, such automated transmission of content can be particularly useful with wireless communications, where devices tend to have sporadic or limited network connectivity. In that context, a wireless communication device may receive content updates while online, and a user of the device may thereafter access the updated content from local data storage regardless of whether the device is online or offline at the time.

Such automatic transmissions of content can be used for various purposes. By way of example, automatic content transmissions can be used to maintain one or more "content-channels" on a communication device. In practice, the communication device may be programmed with a channel-presentation program that allows a user to selectively view content of one or more channels (akin to TV channels), each of which may be focused on a particular subject (such as sports, weather, or pop-music, for instance). For each channel, a network server may be arranged to periodically push the latest channel content to the device. Conveniently, whenever a user of the device then selects a desired channel to view, the channel-presentation program can present the user with the latest set of content that was downloaded for that channel, without having to wait for the device to download the content.

As another example, automatic content transmissions can be used to maintain on a communication device an up-to-date content-catalog, i.e., a listing of downloadable-content, such as content that is available for free-download or for purchase. Rather than maintaining such a content-catalog strictly online and requiring real-time online browsing through the catalog, the device can maintain a local copy of the content catalog. To facilitate this, a network server (e.g., a content server) may be programmed to periodically transmit the latest version of the content-catalog to the device. Conveniently, when a user of the device seeks to view the content-catalog, the user could view the up-to-date local copy without having to wait for the device to download the catalog from the server.

SUMMARY

An issue that may arise when implementing an automatic content transmission service is how often content should be transmitted to a communication device. For instance, if a server is arranged to transmit news updates to a communication device, at issue may be how often the server should transmit news updates. If the server transmits news updates too infrequently, the news stored at the communication device would become stale, thus defeating the purpose of providing automatic news updates. On the other hand, if the server transmits news updates too often, it is likely that a given news story will be replaced with updated news before the user has a chance to see it, thus defeating the benefit of providing the news story in the first place. Furthermore, transmitting news updates too often can drain network resources, particularly in a wireless communication scenario where air interface resources are scant.

The present invention addresses this issue by providing a method for dynamically adjusting the frequency of content transmissions to a communication device. According to the invention, content transmission frequency will be set based on how often content-related user-activity occurs on the device. For instance, if the device includes a program application through which a user can direct the device to present content that was previously transmitted to the device, the frequency of content transmission may be set based on how often the user interacts with that program application, such as how often the user invokes the application, how often the user navigates to content through the application, and/or how often the user directs the device to present content through the application.

In practice, the communication device may report to a network server how often such content-related user-activity occurs on the device, and the network server may use the reported information as a basis to set the frequency at which content transmissions to the device should occur. For instance, the device may log such user-activity and at various times may report to the server what time such content-related user-activity last occurred. Periodically or in response to other triggering events, the server may then select a frequency of content-transmission based on how long ago the last reported user-activity occurred. By way of example, if the last reported user-activity occurred more than a threshold time ago, the server may set a relatively low frequency for transmitting updates to the device, commensurate with the lack of content-related user-activity. On the other hand, if the last reported user-activity occurred less than the threshold time ago, the server may set a relatively high frequency for transmitting updates to the device, commensurate with the frequency of content-related user-activity. Multiple such thresholds, with corresponding transmission frequencies, could be applied as well.

These as well as other aspects, advantages, and alternatives will become apparent to those of ordinary skill in the art by reading the following detailed description, with reference where appropriate to the accompanying drawings. It should be understood, of course, that this summary and other description provided below is set forth for purposes of example only, and that numerous variations are possible, within the scope of the claimed invention.

BRIEF DESCRIPTION OF THE DRAWINGS

FIG. 4 is a flow chart depicting functions that can be carried out in accordance with the exemplary embodiment.

DETAILED DESCRIPTION

Figure 1:
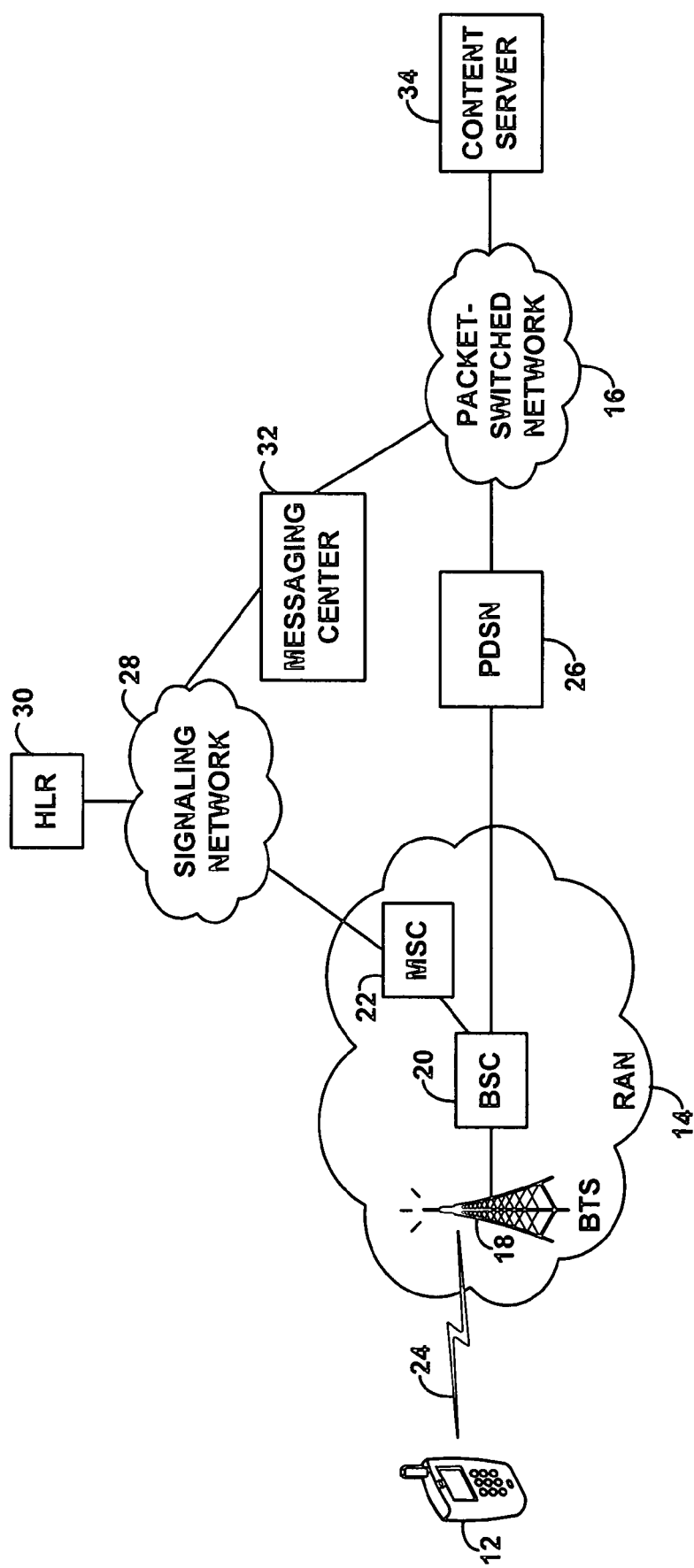
FIG. 1 is a simplified block diagram of a network in which an exemplary embodiment of the invention can be implemented.

The present invention is characterized here as a method for managing how often content is transmitted over a network to a communication device. The method may be implemented by one or more servers or other entities, to help make the frequency of content transmission commensurate with the frequency of content-related user-activity on the device.

1. OVERVIEW

In one respect, an exemplary embodiment of the invention may take the form of a method for managing how often content is transmitted over a network to a communication device. Such a method may involve the steps of (i) receiving over the network, from the device, information indicating how often a user of the device has engaged in predefined content-related interaction with the device; and (ii) using the received information as a basis to determine a frequency at which to transmit the content over the network to the device.

In this method, the device may comprise a cellular wireless device, such as a cell phone or wirelessly-equipped personal digital assistant for instance. Further, the information received from the device may indicate how often a user (i.e., one or more users) of the device has interacted with an application on the device, such as a channel-presentation program for instance, that is arranged to present previously received content to the user.

In another respect, the exemplary method may involve (i) receiving over the network, from the device, a report of a time when a user of the device last engaged in predefined content-related interaction with the device and (ii) using the reported time as a basis to determine a frequency at which to transmit the content over the network to the device. In turn, the method may involve transmitting the content over the network to the device at approximately the determined frequency, i.e., at the determined frequency or using the determined frequency as a basis to trigger transmission of content to the device.

In this method as well, the device may comprise a cellular wireless device, such as a cell phone or personal digital assistant. Further, the act of transmitting content over the network to the device may comprise transmitting the content using a transmission-mechanism such as (i) MMS messaging, where an MMS notification message is sent to the device to trigger the device to then download the content or (ii) SMS messaging, where the content is sent to the device as bearer data within an SMS message. Still further, the content may take various forms, such as one or more channel-definitions for a channel-presentation program, or a content catalog, for instance.

In an example arrangement, the device may be programmed with a content-presentation application, and the predefined content-related interaction with the device may then comprise user interaction with the content-presentation application. The user interaction with the content-presentation application may take various forms, examples of which include (i) user-initiation of the content-presentation application and (ii) user interaction with the content-presentation application (such as user direction of the application to present previously received content), once the application is initiated.

The act of receiving the report of the last time such activity occurred may involve receiving the report within a content-request message that the device itself transmitted. Such a request could be generated in response to a user autonomously requesting content. For instance, if the device received a portion of a news story or other content and presented it to the user, the user may direct the device to download a full version of the content, and the device may thus send the content-request seeking the more full version. Alternatively, the content-request could be generated by the device in response to a content-notification message that the device receives. In that case, the content-notification message could be an MMS-notification message, and the content-request message could be an HTTP request message. Still alternatively, the device may provide periodic report messages, each indicating respectively a last time (as of the report message), if any, at which the predefined content-related interaction occurred. Other examples are possible as well.

In turn, the act of using the reported time (of last content-related user-interaction on the device) as a basis to determine a frequency to transmit the content over the network to the device may take the form of a threshold analysis. For instance, it may involve comparing the current time to the reported time in order to determine how much time has passed since the reported time, i.e., how long ago the last reported user-interaction occurred, and then setting the content-transmission frequency based on that determined amount of time. More particularly, the content-transmission frequency could be set to one value if the determined amount of time exceeds a threshold and to another value if the determined amount of time does not exceed the threshold.

In yet another respect, the exemplary embodiment may take the form of a method carried out in a communication system of the type including a cellular wireless device served by a radio access network, where the radio access network provides connectivity with a packet-switched network, a server sits on the packet-switched network, and the cellular wireless device is programmed with a channel-presentation program through which a user can direct the device to present channel-content received from the server. In that context or others, the method may then involve (i) logging in the wireless device information regarding how often the user has interacted with the channel-presentation program, (ii) reporting at least a portion of the logged information (e.g., a last interaction time) from the wireless device to the server, and (iii) using the reported information, at the server, to determine a frequency with which to transmit further channel-content to the wireless device. Further, the method may then involve transmitting the further channel-content to the wireless device at approximately the determined frequency.

2. EXAMPLE NETWORK ARCHITECTURE

As noted above, the invention can be applied in various types of communication systems but is particularly useful in the context of cellular wireless communications. Accordingly, an exemplary embodiment of the invention will be illustrated and described in terms of a cellular wireless communication system, with the understanding that various concepts described here can be readily applied without limitation in other scenarios as well.

FIG. 1 is a simplified block diagram of telecommunications network in which the exemplary embodiment can be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

FIG. 1 depicts a wireless communication device 12 served by a radio access network (RAN) 14 that provides connectivity with a packet-switched network 16. RAN 16 is shown by way of example including a base transceiver station (BTS) 18, a base station controller (BSC) 20, and a mobile switching center (MSC) 22. BTS 22 radiates to define one or more wireless coverage areas in which device 12 can communicate with the BTS 18 over an air interface 24, according to any agreed air-interface protocol (examples of which include CDMA, GSM, and TDMA). BTS 18 is then coupled with BSC 20, which manages aspects of communications over air interface 24. BSC 20 is in turn coupled with MSC 22, which provides connectivity with the public switched telephone network (PSTN) (not shown), and BSC 20 is further coupled with a packet data serving node (PDSN) 26, which provides connectivity with the packet-switched network 16.

RAN 14 and other components of FIG. 1 are preferably arranged to support wireless packet-data communications, so that devices 12 can communicate with entities on packet-switched network 16. In an exemplary system, device 12 may acquire wireless packet-data connectivity by first transmitting a packet-data origination-request over an air interface access channel to the RAN 14. Upon receipt of the request, BSC 20 may then establish a radio link layer connection with the device 12 and may signal to PDSN 26 to facilitate establishment of a packet-data connection, and PDSN 26 may set up a data link layer connection (e.g., point-to-point protocol (PPP) session) with the device. Further, the PDSN or a Mobile-IP home agent (not shown) may then assign an IP address to the device, so the device can then engage in IP communications on network 16 via its radio link and data link layer connections. Other procedures for establishing and using a wireless packet-data connection are possible as well, depending on the air interface protocol used.

As further shown in FIG. 1, MSC 22 (or more generally RAN 14) is coupled with a signaling network 28, such as a Signaling System #7 (SS7) network, for instance. Signaling network 28 facilitates signaling communication between the RAN 14 and various other entities, such as a home location register (HLR) 30 and a messaging service center 32. These various entities may take various forms.

HLR 30 functions in a well known manner to maintain wireless-device service profiles and to deliver a copy of a device's service profile to the MSC that is currently serving the device. Typically, HLR 30 also maintains a record of the last known location of each wireless device, such as the cell, cell sector, or MSC serving-area where the device last registered for service, for instance, so HLR 30 can function to route messages to the MSC serving a destination wireless device.

Messaging center 32 comprises a short messaging service center (SMSC) and/or a multimedia messaging service center (MMSC), for instance, arranged in a well known manner to facilitate transmission of text and/or multimedia messages to wireless devices. As further shown, messaging center 30 preferably also sits as a node on packet-switched network 16, so that messaging center 30 can receive messages that are being transmitted from other entities on the network 16 to wireless devices served by RAN 14.

As an SMSC, messaging center 32 may receive an SMS message (e.g., an industry standard SMDPP message) destined to a wireless device and may forward the message to the MSC that is currently serving the wireless device to facilitate transmission of the message over the air to the device. As an MMSC, on the other hand, messaging center 32 may receive an MMS message carrying content for delivery to a wireless device, and the MMSC may store the content and send a specially-coded SMS message ("MMS-notification message") to the device, providing the device with a URL pointing to the stored content. Upon receipt of the MMS-notification message, the device may then acquire a packet-data connection if it does not have one already and then download the content from the designated URL, such as by sending an HTTP request message to the URL and then receiving the content in an HTTP response message.

Shown sitting as a node on packet-switched network 16 is a content server 34, which functions to send content to communication devices, such as to wireless device 12 for instance. Pursuant to the exemplary embodiment, content server 34 additionally functions to receive information from device 12 indicating how often content-related user-activity has occurred on the device (or simply when such activity last occurred) and to accordingly adjust a frequency at which the server 34 thereafter transmits content to the device.

Although just one server 34 is shown, it is equally possible that multiple servers or other network entities could be provided to carry out these or analogous functions consistent with the invention. For instance, one server could be programmed to function as a transmission-frequency controller, receiving and analyzing user-interaction information provided by various communication devices, and determining for each device an appropriate frequency at which content should be transmitted to the device. Another server could then be programmed to function as a content server, transmitting content to one or more devices at a frequency determined by the transmission-frequency controller. Other arrangements are possible as well.

Figure 2:
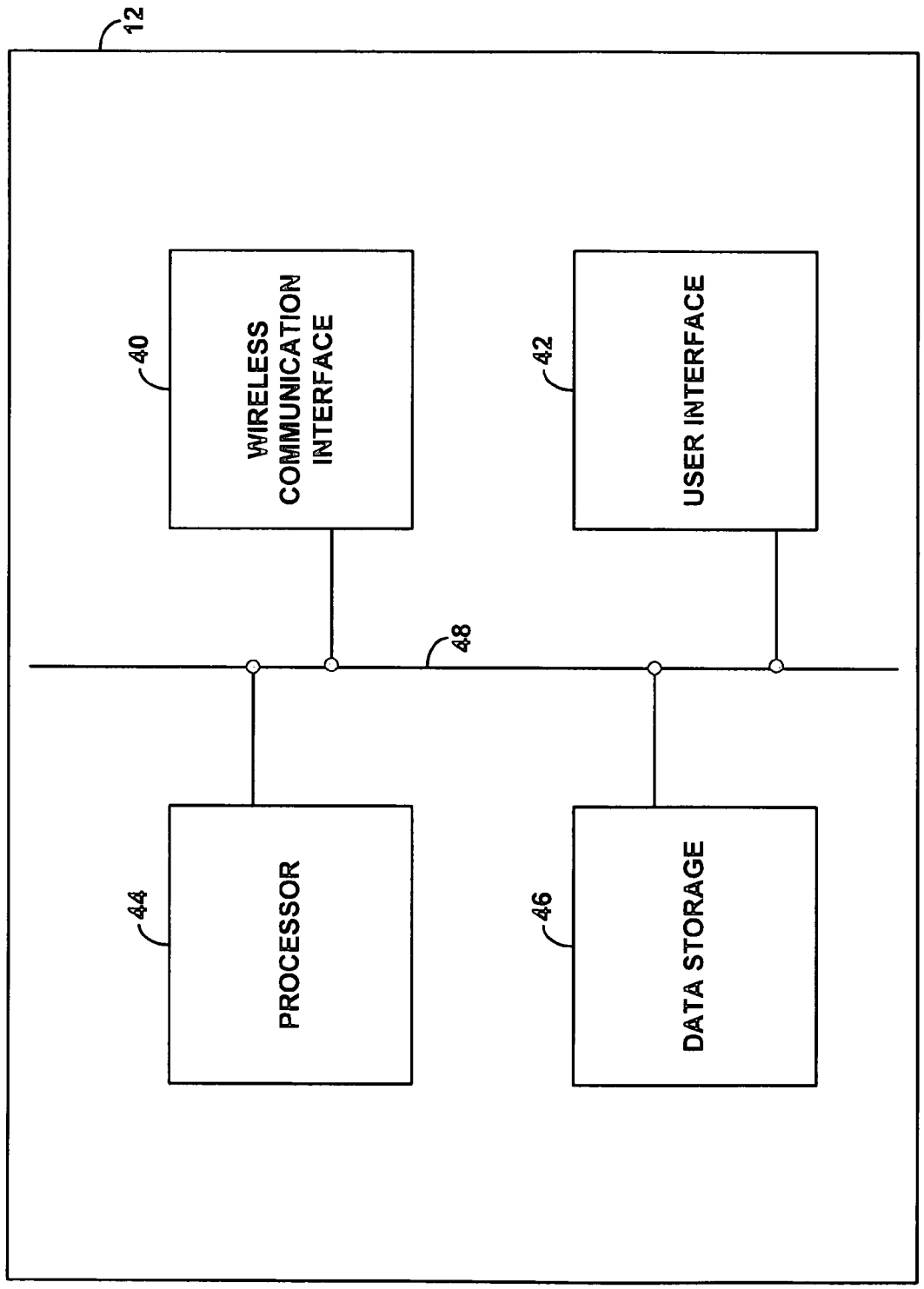
FIG. 2 is a simplified block diagram of a communication device operable within the exemplary embodiment.

FIG. 2 is a simplified block diagram of wireless device 12, depicting various components that can be included in the device in accordance with the exemplary embodiment. As shown, the exemplary wireless device 12 includes a wireless communication interface 40, a user interface 42, a processor 44, and data storage 46, all of which may be coupled together by a system bus, network, or other mechanism 48.

Wireless communication interface 40 may comprise a chipset and antenna arranged to facilitate wireless communication with RAN 14 according to an agreed air-interface protocol (including any now known or later developed). Exemplary chipsets include the well known "MSM" series of chipsets available from Qualcomm Incorporated. User interface 42, in turn, comprises input/output components, such as a display, a speaker, a keypad, and a microphone, for presenting content and other information to a user and for receiving input from a user.

Processor 44 may comprise one or more general purpose processors (e.g., INTEL microprocessors) and/or one or more special purpose processors (e.g., digital signal processors).

Data storage 46, in turn, may comprise one or more volatile and/or nonvolatile storage components such as magnetic, optical, or organic storage, and may be integrated in whole or in part with processor 46.

Data storage 46 preferably contains or is arranged to contain log data indicating the time or times at which content-related user-interaction has occurred, to facilitate reporting this information to server 34. Further, data storage 46 preferably contains program instructions (e.g., machine language instructions) executable by processor 44 to carry out various functions described herein. For instance, the program instructions may define logic for acquiring wireless packet-data connectivity and engaging in wireless packet-data communication, logic for receiving and presenting content such as content-channels or content-catalogs for instance, logic for logging content-related user-interaction, and logic for reporting information about content-related user-interaction to server 34.

Figure 3:
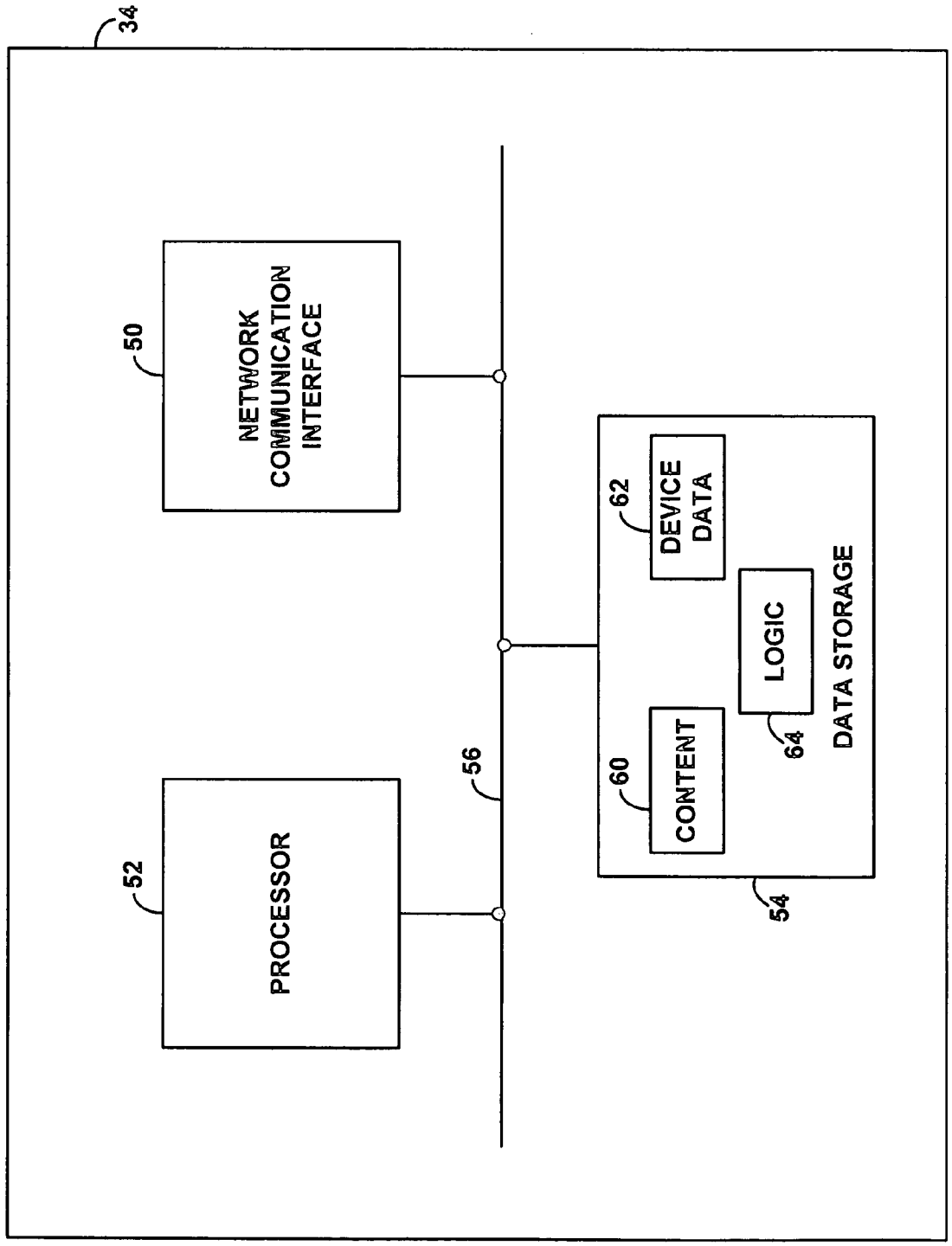
FIG. 3 is a simplified block diagram of a content server operable within the exemplary embodiment.

FIG. 3 is next a simplified block diagram of server 34, depicting various components that can be included in the server in accordance with the exemplary embodiment. As shown, the exemplary server includes a network communication interface 50, a processor 52, and data storage 54, all of which may be coupled together by a system bus, network, or other mechanism 56.

Network communication interface 50 functions to connect server 34 with packet-switched network 16 so that server 34 can engage in packet-data communication over the network 16. As such, network communication interface 50 may comprise an Ethernet network interface card, a wireless network interface module (e.g., an IEEE 802.11 interface), and/or any other network interface now known or later developed.

Processor 52 may comprise one or more general purpose processors (e.g., INTEL microprocessors) and/or dedicated processors (e.g., digital signal processors). Data storage 54, in turn, may comprise one or more magnetic, optical, organic, or other storage components, whether volatile or non-volatile, and may be integrated in whole or in part with processor 52. As shown, data storage 54 preferably holds or is arranged to hold content 60, device data 62, and program logic 64.

Content 60 comprises content that server 34 may transmit to communication devices such as device 12. Although not shown in FIG. 1, server 34 will likely obtain this content from one or more content sources on packet-switched network 16. The content sources may provide various content that may be updated from time to time, such as news, weather, stock reports, sports scores, and the like. Thus, the content 60 in data storage 54 of server 34 may vary and be updated over time, through communication between server 34 and the various content sources. This content may be stored by server 34 in the form of one or more XML files, such as HTML documents for instance, or in any other manner now known or later developed.

Device data 62 comprises data representing various information regarding communication devices such as device 12. As such, device data 62 may be categorized by device ID (e.g., mobile identification number, network access identifier, or the like). For each device, device data 62 preferably includes information indicating how often content-related user-interaction has occurred on the device, or simply when the last reported content-related user-interaction occurred on the device, to enable a determination of content-transmission frequency for the device. Further, for each device, device data 62 includes an indication of content-transmission frequency determined based on the information regarding content-related user-interaction.

Logic 64, in turn, comprises program logic (e.g., machine language instructions) executable by processor 52 to carry out various functions described herein. For instance, the program logic may be executable by processor 52 to receive from device 12 reports of content-related user-interaction, such as information indicating how often such interaction has occurred on the device, or simply when such interaction last occurred on the device. The program logic may then cause the processor 52 to record that information in device data 64, possibly in place of previously received information for the device, or perhaps to update the device data 64 such as by averaging data points to provide an effective measure of how often content-related user-interaction has occurred on the device. Further, the program logic may cause processor 52 to periodically (and/or in response to some other triggering events) determine a content-transmission frequency for the device 12 based on the user-interaction data for the device.

In addition, logic 64 may include reference data accessible by processor 52 to facilitate determination of content-transmission frequency. The reference data may take various forms. By way of example, the reference data may comprise a table of correlation data, indicating one or more threshold time durations and, for each, a corresponding content-transmission frequency. As noted above, server 34 may then periodically analyze the user-interaction data to compare the current time with the last reported instance of content-related user-interaction. If the last reported instance of content-related user-interaction occurred more than a threshold time period ago, then the correlation data may specify a relatively low content-transmission frequency, and server 34 may set the content-transmission frequency accordingly in device data 62. On the other hand, if the last reported instance of content-related user-interaction occurred less than the threshold time period ago, then the correlation data may specify a relatively high content-transmission frequency, and server 34 may set the content-transmission frequency accordingly in device data 62.

It should be understood that server 34 could apply other procedures or algorithms to determine a content-transmission frequency based on information regarding content-related user-interaction on the device. For instance, the server 34 could base its determination on a reported or computed rate of content-related user-interaction on the device, rather than just on a measure of the last reported instance of content-related user interaction. Further, the "frequency" determined by the server 34 could itself be a rate of transmissions per unit time, or it could more simply be a determination of when a next transmission should occur, measured from the time of the last transmission to the device for instance. Other arrangements are possible as well.

3. EXAMPLE OPERATION

Referring next to FIG. 4, a flow chart is provided, to summarize some of the functions that can be carried out in accordance with the exemplary embodiment. As shown in FIG. 4, at step 70, server 34 receives from device 12 an indication of how often content-related user-interaction has occurred on the device (e.g., when the last such interaction occurred). As explained above, device 12 may send this indication to server 34 at various times, such as when a user directs device 12 to send a content request to server 34, such as when the device automatically responds to an MMS-notification message by sending an HTTP request message to server 34 seeking the content, or such as periodically or in response to other triggering events. In the event device 12 sends the indication to the server in an HTTP request, device 12 may provide the indication in the form of a URL query parameter or in an HTTP header parameter, just as other information is well known to be conveyed from a client to a server.

At step 72, server 34 then uses the indication as a basis to determine a frequency at which to transmit content to the device 12. As noted above, this function may involve periodically querying correlation data to determine, based on how long ago the last reported instance of content-related user-interaction occurred on the device, what content-transmission frequency to use for the device. The function may then involve recording that determined content-transmission frequency in the device data for the device.

At step 74, server 34 then transmits content to the device at the determined content-transmission frequency. For instance, if the determined frequency is once every 4 hours, then the server transmits content (e.g., content-channel updates, or content-catalog updates) to the device every 4 hours. In that case, the server would next transmit content to the device 4 hours after the server last transmitted content to the device.

The server may transmit content to the device using any transmission mechanism now known or later developed. By way of example, the server may transmit the content using MMS messaging as described above, by sending the content in an MMS message to messaging center 32, which would cause messaging center 32 to send an MMS-notification message to device 12, which would in turn cause device 12 (possibly with user approval) to engage in HTTP communication to download the content from the messaging center 32. As another example, the server may transmit the content using SMS messaging, by sending the content within an SMS message to the device, via messaging center 32. Alternatively, if the content is too large to fit within a single SMS message, the server could split the content into parts and send the parts in a series of SMS messages to the device. A message handler application on the device could then re-assemble the parts to recover the content.

4. CONCLUSION

An exemplary embodiment has been described above. It should be understood, however, that variations from the embodiment discussed are possible, while remaining within the true spirit and scope of the invention as claimed.

We claim:

1. In a system in which a communication device stores a content-catalog defining a list of content downloadable to the device, a method of managing how often updates of the content-catalog are transmitted over a network to the communication device, the method comprising:
   receiving over the network, from the device, information indicating how often a user of the device has directed the device to present the content-catalog; and
   using the received information as a basis to determine a frequency at which to transmit the updates over the network to the device.

2. The method of claim 1, wherein the device comprises a cellular wireless device, wherein the information indicates how often a user of the device has interacted with an application on the device that is arranged to present the content-catalog to the user.

3. A method of managing how often updates of a content-catalog are transmitted over a network to a communication device, the method comprising:
   receiving over the network, from the device, a report of a time when a user of the device last directed the device to present the content-catalog; and
   using the reported time as a basis to determine a frequency at which to transmit updates of the content-catalog over the network to the device.

4. The method of claim 3, further comprising transmitting the updates over the network to the device at approximately the determined frequency.

5. The method of claim 3, wherein the device comprises a cellular wireless device.

6. The method of claim 5, wherein transmitting an update over the network to the device comprises transmitting the update using a transmission-mechanism selected from the group consisting of (i) MMS messaging in which an MMS notification message is sent to the device to trigger the device to then download the update, and (ii) SMS messaging in which the update is sent to the device within an SMS message.

7. The method of claim 5, wherein the cellular wireless device is selected from the group consisting of a cell phone and a personal digital assistant.

8. A method of managing how often content is transmitted over a network to a communication device the method comprising:
   receiving over the network, from the device, information indicating at least one of (i) how often a user of the device has engaged in predefined content-related interaction with the device and (ii) a time when a user of the device last engaged in the predefined content-related interaction with the device; and
   using the received information as a basis to determine a frequency at which to transmit the content over the network to the device,
   wherein the device is programmed with a content-presentation application, and wherein the predefined content-related interaction with the device comprises user-initiation of the content-presentation application.

9. A method of managing how often content is transmitted over a network to a communication device, the method comprising:
   receiving over the network, from the device, a report of a time when a user of the device last engaged in predefined content-related interaction with the device, wherein receiving the report of the time comprises receiving the report within a content-request message transmitted from the device; and
   using the reported time as a basis to determine a frequency at which to transmit the content over the network to the device.

10. The method of claim 9, wherein the content-request message is transmitted from the device in response to a content-notification message, wherein the content-notification message comprises an MMS-notification message, and wherein the content-request message comprises an HTTP request message.

11. The method of claim 9, wherein the content-request message comprises a message seeking a more full version of partial content previously transmitted to the device.

12. The method of claim 9, further comprising:
   receiving periodic report messages from the device, each periodic report message indicating respectively a last time of the predefined content-related interaction, if any.

13. The method of claim 9, wherein using the reported time as a basis to determine a frequency at which to transmit the content over the network to the device comprises:
   comparing a current time to the reported time to determine an amount of time that has passed since the reported time; and
   setting the frequency based on the determined amount of time that has passed.

14. The method of claim 13, wherein setting the frequency based on the determined amount of time that has passed comprises:

setting the frequency to a first value if the determined amount of time exceeds a threshold; and setting the frequency to a second value, different than the first value, if the determined amount of time does not exceed the threshold.

* * * * *